United States Patent
Wang

[11] Patent Number: 5,826,494
[45] Date of Patent: Oct. 27, 1998

[54] COOKING DEVICE

[76] Inventor: Chung-Che Wang, No. 50, Sec. 5, An-Ho Rd., Tainan City, Taiwan

[21] Appl. No.: 920,072

[22] Filed: Aug. 26, 1997

[51] Int. Cl.[6] ............... A47J 27/00; A47J 27/04; A47J 36/06; A47J 36/12
[52] U.S. Cl. ................ 99/340; 99/410; 99/413; 99/417; 99/418
[58] Field of Search .................. 99/339, 340, 403, 99/410–418; 126/369, 390; 220/912, 428; 210/244–246, 464–469, 475, 477

[56] References Cited

U.S. PATENT DOCUMENTS

| | | | |
|---|---|---|---|
| 1,260,794 | 3/1918 | Paquette | 210/245 |
| 3,808,963 | 5/1974 | Ludena | 99/413 X |
| 3,972,318 | 8/1976 | Lenoir | 126/369 X |
| 4,317,017 | 2/1982 | Bowen . | |
| 4,509,412 | 4/1985 | Whittenburg et al. | 99/413 X |
| 4,574,776 | 3/1986 | Hidle | 126/369 |
| 4,604,989 | 8/1986 | Kita | 126/369 |
| 4,626,352 | 12/1986 | Massey et al. | 210/469 |
| 4,951,558 | 8/1990 | Filiuzzi | 99/403 X |
| 5,092,229 | 3/1992 | Chen | 99/403 X |
| 5,211,105 | 5/1993 | Liu | 99/413 X |
| 5,235,904 | 8/1993 | Ludena | 99/417 X |
| 5,355,777 | 10/1994 | Chen et al. | 99/340 |
| 5,584,235 | 12/1996 | DuBois et al. | 99/413 |

FOREIGN PATENT DOCUMENTS 1294270  10/1972  United Kingdom .

Primary Examiner—Timothy F. Simone
Attorney, Agent, or Firm—Harness, Dickey & Pierce, P.L.C.

[57] ABSTRACT

A cooking device includes a container, a collecting pan, a strainer member and a cover. The container and the collecting pan have base plates and surrounding walls that extend from the base plates. The surrounding wall of the container has an inwardly protruding middle section. The surrounding wall of the collecting pan includes a curved lower section that is connected to the base plate thereof and a top end formed with a horizontal outward extension which is provided with a plurality of vent holes and which is capable of resting on the inwardly protruding middle section when the collecting pan is disposed in the container. The strainer member has a base part capable of resting on the curved lower section when the strainer member is extended into the collecting pan. The cover is disposed removably on top of the container.

4 Claims, 3 Drawing Sheets

COOKING DEVICE

BACKGROUND OF THE INVENTION

1. Field of the Invention

The present invention relates to a cooking device, more particularly to a cooking device which includes separable components and which can be used to remove excess oil from cooked food.

2. Description of the Related Art

A conventional steaming pot includes an outer pot for receiving water, at least one support frame disposed in the outer pot, and a removable cover for covering the support frame and the outer pot. The support frame has a substantially flat portion that is spaced from the bottom of the outer pot and that is usually provided with a sheet of cotton on which food to be steamed is placed. When the pot is heated to steam the food, a portion of seasonings that are previously applied on the food is vaporized and is carried by the steam so as to be ultimately condensed and dropped into the outer pot to mix with the water received therein. In addition, oil generated during the steaming process also drops into the outer pot to mix with the water received therein. This can affect the taste of the cooked food adversely. Moreover, the outer pot will be relatively hard to clean for subsequent use.

The conventional steaming pot may be modified by replacing the sheet of cotton with a disk on which the food to be steamed is placed. In this way, most of the evaporated seasonings which are carried by the steam will drop into the disk, and the oil that is generated during the steaming of the food will remain in the disk rather than fall into the outer pot. However, in this way, it is relatively difficult to separate the oil from the steamed food, and the steam will condense and remain in the disk to mix with the steamed food. This also affects the taste of the food adversely.

SUMMARY OF THE INVENTION

The main object of the present invention is to provide a multi-purpose cooking device which is suitable for cooking, steaming and frying food, and which is capable of overcoming the problems encountered in the prior art.

Accordingly, the cooking device of the present invention includes a container, a collecting pan, a strainer member and a cover. The container has a base plate and a surrounding wall extending from the base plate. The base plate and the surrounding wall cooperatively confine a receiving space. The surrounding wall has an upper end portion and an inwardly protruding middle section. The collecting pan is disposed removably in the container. The collecting pan has a base plate and a surrounding wall that includes a curving lower section connected to the base plate and a top end formed with a horizontal outward extension. The outward extension is provided with a plurality of vent holes. The outward extension is capable of resting on the inwardly protruding middle section of the container such that the base plate of the collecting pan defines a first clearance with the base plate of the container and such that the surrounding wall of the collecting pan defines a second clearance with the surrounding wall of the container when the collecting pan is disposed in the container. The strainer member is disposed removably in the container. The strainer member has a base part and a peripheral part extending upwardly from the base part. The base part is capable of resting on the curving lower section of the surrounding wall of the collecting pan such that the base part forms a third clearance with the base plate of the collecting pan when the strainer member is extended into the collecting pan while the collecting pan is disposed in the container. The cover is disposed removably on the upper end portion of the surrounding wall of the container.

BRIEF DESCRIPTION OF THE DRAWINGS

Other features and advantages of the present invention will become apparent in the following detailed description of the preferred embodiment with reference to the accompanying drawings, of which.

DESCRIPTION OF THE PREFERRED EMBODIMENT

Figure 1:
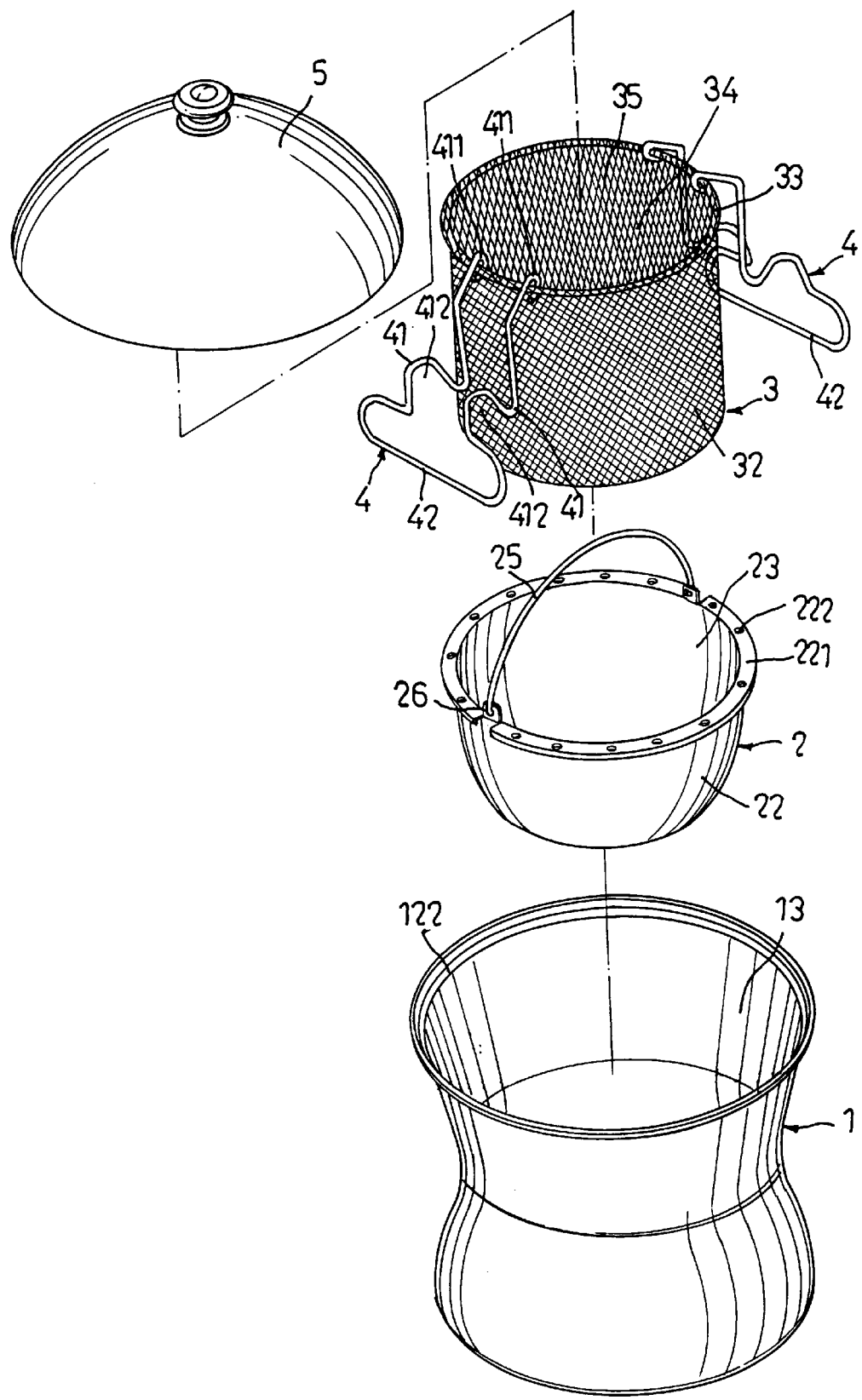
FIG. 1 is an exploded perspective view illustrating a cooking device according to a preferred embodiment of the present invention.
Figure 2:
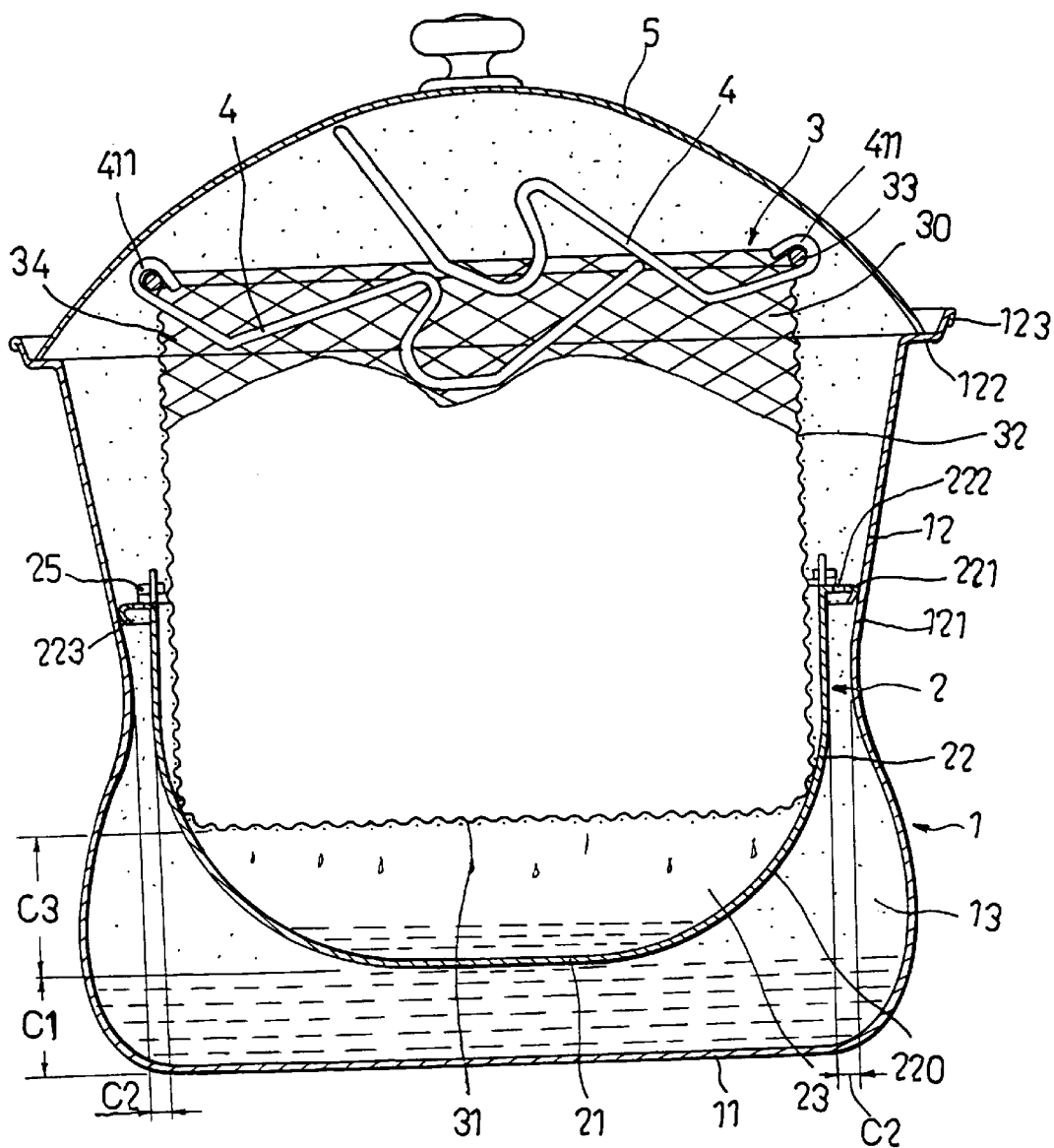
FIG. 2 is a cross-sectional view illustrating the cooking device of the preferred embodiment when used for steaming food.

Referring to FIGS. 1 and 2, the cooking device according to the preferred embodiment of the present invention is shown to include a container 1, a collecting pan 2, a strainer member 3 and a cover 5.

The container 1 can be heated directly by a source of heat, such as fire. The container 1 has a base plate 11 and a surrounding wall 12 extending from the base plate 11. The surrounding wall 12 has an upper end portion formed with an outwardly extending rim portion 122 that has an outer edge provided with an upwardly inclining flange 123. The surrounding wall 12 further has an inwardly protruding middle section 121. The base plate 11 and the surrounding wall 12 cooperatively confine a receiving space 13 that is capable of receiving liquid, such as water, therein.

The collecting pan 2 is disposed removably in the container 1. The collecting pan 2 has a base plate 21 and a surrounding wall 22 that includes a curving lower section 220 connected to the base plate 21. The base plate 21 and the surrounding wall 22 of the collecting pan 2 cooperatively confine a collecting space 23. The surrounding wall 22 further includes a top end formed with a horizontal outward extension 221 that is provided with a plurality of vent holes 222. The outward extension 221 is capable of resting on the inwardly protruding middle section 121 such that the base plate 21 of the collecting pan 2 defines a first clearance (C1) with the base plate 11 of the container 1 and such that the surrounding wall 22 of the collecting pan 2 defines a second clearance (C2) with the surrounding wall 12 of the container 1 when the collecting pan 2 is disposed in the container 1. The outward extension 221 of the collecting pan 2 is further formed with a pair of diametrically opposite lugs 26. The collecting pan 2 further includes a curved handle 25 with two opposite ends mounted pivotally and respectively to the lugs 26. The handle 25 is turnable towards the outward extension 221 so as to permit extension of the strainer member 3 into the collecting space 23 of the collecting pan 2.

Figure 3:
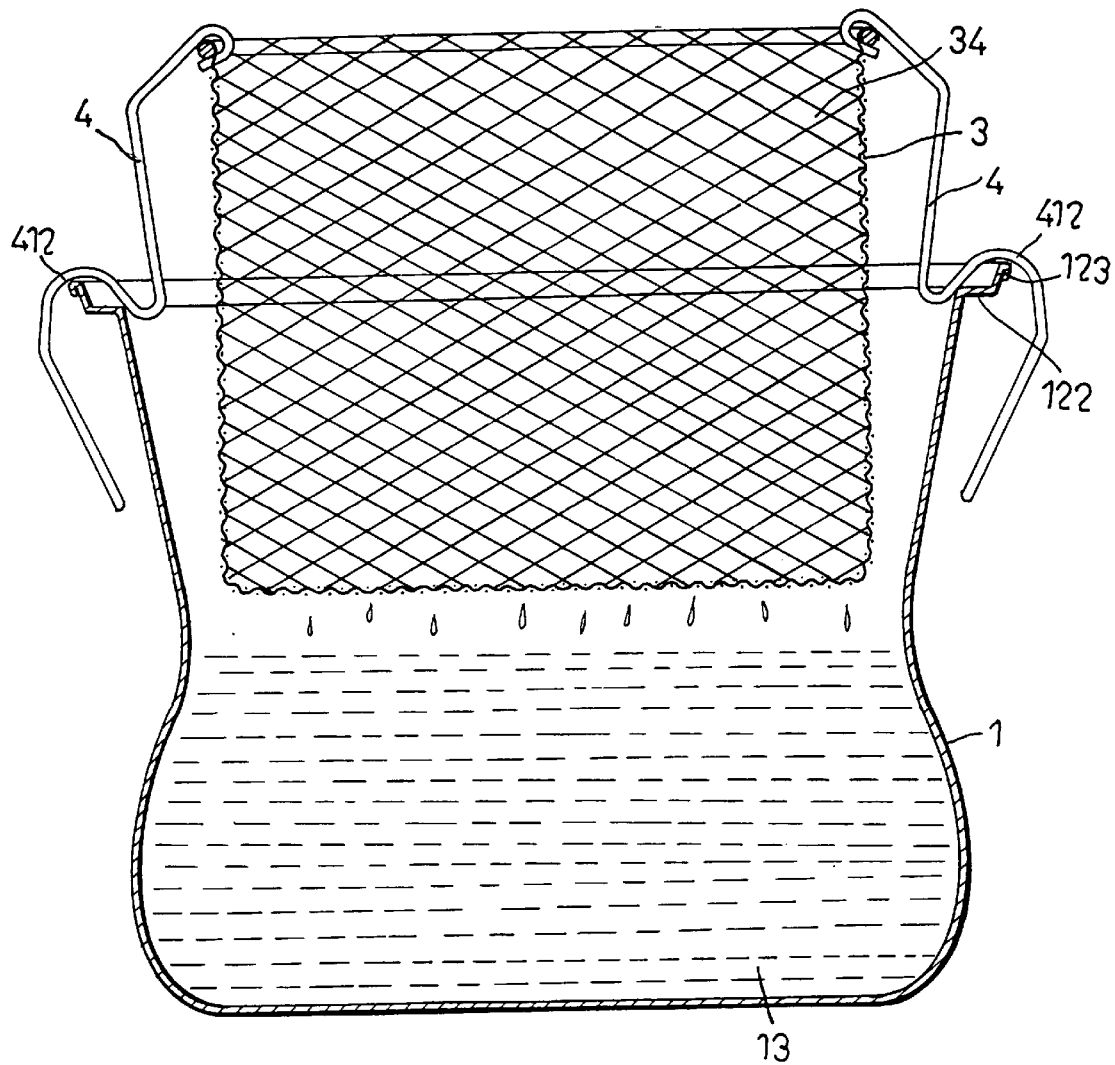
FIG. 3 is a cross-sectional view illustrating the cooking device of the preferred embodiment when a strainer member is suspended in a container of the cooking device.

The strainer member 3 is made of a high-temperature durable material and is formed as a meshed body 30. The strainer member 3 has a base part 31 and a peripheral part 32 extending upwardly from the base part 31. The base part 31 and the peripheral part 32 cooperatively confine a strainer space 34. The peripheral part 32 has an upper end portion which defines a top opening 35 and which is provided with an annular frame 33 around the top opening 35. The base part 31 is capable of resting on the curving lower section 220 of the surrounding wall 22 of the collecting pan 2 such that the base part 31 forms a third clearance (C3) with the base plate 21 of the collecting pan 2 when the strainer member 3 is extended into the collecting pan 2 while the collecting pan 2 is disposed in the container 1. The strainer member 3 further includes a pair of opposite support frames 4, each of which is formed from a bent elongated rod and includes two parallel sections 41 with pivot end portions 411 and a grip portion 42 interconnecting the parallel sections 41. The parallel sections 41 include an engaging portion 412. The pivot end portions 411 of the support frames 4 are hooked to the annular frame 33. As such, each of the support frames 4 is movable between a first position, in which the support frames 4 are pivoted inwardly such that the cover 5 is capable of covering the container 1 when the collecting pan 2 and the strainer member 3 are disposed in the container 1, as shown in FIG. 2, and a second position, in which the support frames 4 are pivoted outwardly and are capable of engaging the flange 123 on the rim portion 122 of the container 1 such that the strainer member 3 can be suspended in the container 1 even when the collecting pan 2 is not disposed in the container 1, as shown in FIG. 3. The grip portions 42 of the support frames 4 facilitate lifting of the strainer member 3.

The cover 5 is disposed on the outwardly extending rim portion 122 of the upper end portion of the surrounding wall 12 of the container 1. The cover 5 is generally convex and confines a space that permits extension of the support frames 4 therein when the support frames 4 are in the first position and when the cover 5 is mounted on the container 1 while the collecting pan 2 and the strainer member 3 are disposed in the container 1, as illustrated in FIG. 3.

The container 1, the collecting pan 2 and the strainer member 3 can be used separately and individually. The container 1 can be used for cooking soup. The collecting pan 2 can be used for making salad. The strainer member 3 can be used for straining washed vegetables, fruits and the like.

Referring to FIG. 3, when the cooking device of the present invention is used for frying or cooking food, oil or water is received in the receiving space 13 of the container 1. The food to be cooked or fried is placed within the strainer space 34 of the strainer member 3, which is subsequently placed in the receiving space 13 of the container 1. After the desired frying or cooking procedure is completed, the strainer member 3 is lifted, and the support frames 4 are turned outwardly such that the engaging portions 412 engage the rim portion 122 of the container 1 to suspend the strainer member 3 in the container 1. The excess oil or water on the cooked food can be removed via the strainer member 3.

Referring to FIG. 2, when the cooking device of the present invention is used for steaming food, water is received in the receiving space 13 of the container 1. The collecting pan 2 is then disposed in the container 1 so that the horizontal outward extension 221 rests on the inwardly protruding middle section 121 of the surrounding wall 12 of the container 1. The food to be steamed is placed in the strainer space 34 of the strainer member 3. The strainer member 3 is subsequently placed in the container 1 so that the base part 31 of the strainer member 3 rests on the lower curved section 220 of the surrounding wall 22 of the collecting pan 2. The support frames 4 are turned inwardly to extend into the opening 35 of the strainer member 3. Finally, the cover 5 is mounted on the rim portion 122 of the container 1. When the cooking procedure starts, the water in the receiving space 13 of the container 1 is heated and is then converted into steam. The collecting pan 2 is also heated by the heated water and the steam. The steam enters the strainer space 34 through the vent holes 222 of the collecting pan 2 so as to cook the food. During the steaming procedure, a portion of seasonings that are previously applied on the food is vaporized and is carried by the steam. A portion of the steam is condensed and is then collected in the collecting space 23 of the collecting pan 2. Oil from the food during steaming is also collected in the collecting space 23. After the steaming procedure is completed, the strainer member 3 is lifted, and the steamed food is removed from the strainer member 3. The liquid collected in the collecting pan 2 can be partly added to the steamed food as desired.

The multi-purpose cooking device of the present invention is very helpful in cooking, steaming and frying food. The separable components, including the container, the collecting pan and the strainer member, can be used individually. Food that is steamed with the cooking device of the present invention is not subjected to the adverse effects of excess moisture and oil.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A cooking device comprising:
   a container having a base plate and a surrounding wall extending from said base plate, said base plate and said surrounding wall cooperatively confining a receiving space, said surrounding wall having an upper end portion and an inwardly protruding middle section;
   a collecting pan disposed removably in said container, said collecting pan having a base plate and a surrounding wall that includes a curving lower section connected to said base plate and a top end formed with a horizontal outward extension, said outward extension being provided with a plurality of vent holes, said outward extension being capable of resting on said inwardly protruding middle section of said container such that said base plate of said collecting pan defines a first clearance with said base plate of said container and such that said surrounding wall of said collecting pan defines a second clearance with said surrounding wall of said container when said collecting pan is disposed in said container;
   a strainer member disposed removably in said container, said strainer member having a base part and a peripheral part extending upwardly from said base part, said base part being capable of resting on said curving lower section of said surrounding wall of said collecting pan such that said base part forms a third clearance with said base plate of said collecting pan when said strainer member is extended into said collecting pan while said collecting pan is disposed in said container; and
   a cover disposed removably on said upper end portion of said surrounding wall of said container.

2. The cooking device according to claim 1, wherein said upper end portion of said surrounding wall of said container is provided with an outwardly extending rim portion, said strainer member further comprising a pair of opposite support frames having pivot end portions hooked to an upper end portion of said strainer member, each of said support frames being capable of moving between a first position, in which said support frames are pivoted inwardly such that said cover is capable of covering said container when said collecting pan and said strainer member are disposed in said container, and a second position, in which said support frames are pivoted outwardly and are capable of engaging said rim portion of said container such that said strainer member can be suspended in said container even when said collecting pan is not disposed in said container.

3. The cooking device according to claim 2, wherein said cover is generally convex and confines a space that permits extension of said support frames thereinto when said support frames are in the first position and when said cover is mounted on said container while said strainer member and said collecting pan are disposed in said container.

4. The cooking device according to claim 1, wherein said outward extension of said collecting pan is formed with a pair of diametrically opposite lugs, said collecting pan further having a curved handle with two opposite ends mounted pivotally and respectively to said lugs, said handle being turnable towards said outward extension so as to permit extension of said strainer member into said collecting pan.

* * * * *